Nov. 10, 1942.   S. C. HETH ET AL   2,301,873
REEL
Original Filed March 11, 1937

INVENTORS.
Sherman C Heth
William B Tallman
BY Emerson B Donnell
ATTORNEY

Patented Nov. 10, 1942

2,301,873

UNITED STATES PATENT OFFICE 2,301,873

REEL

Sherman C. Heth and William B. Tallman, Racine, Wis., assignors to J. I. Case Company, Racine, Wis., a corporation Original application March 11, 1937, Serial No. 130,257, now Patent No. 2,199,629, dated May 7, 1940. Divided and this application May 4, 1940, Serial No. 333,358

3 Claims. (Cl. 56—220)

The present invention relates to reels for harvesting devices, the reel herein disclosed being similar to that shown in the co-pending application of Sherman C. Heth and William B. Tallman, Serial No. 130,257, filed March 11, 1937, now Patent No. 2,199,629, granted May 7, 1940, and of which this application is a division.

An object of the invention is to generally improve the construction and operation of devices of this class. Further objects are to provide a special structure of reel for harvesting devices; a reel in which the material is prevented from entering the interior and from catching and winding on the bats; a reel which may be run low without causing winding and other trouble in tall material.

More specifically an object of the invention is to provide a harvester reel which presents a sheath-like exterior to the material being operated upon, and a further object is to provide a suitable construction for such a reel and other expedients for the realization of the above objects which will be apparent from the following specification and accompanying drawing in which Figure 1 is a front elevation of a reel illustrative of the invention with parts broken away to show the interior.

Similar reference characters have been applied to the same parts throughout the drawing and specification.

Figure 1:
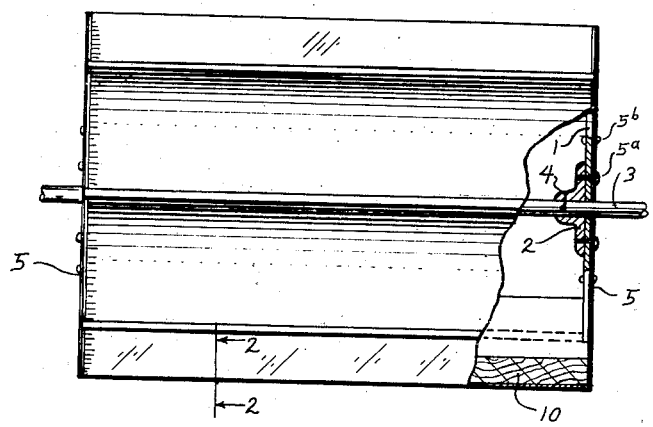
Figure 3:
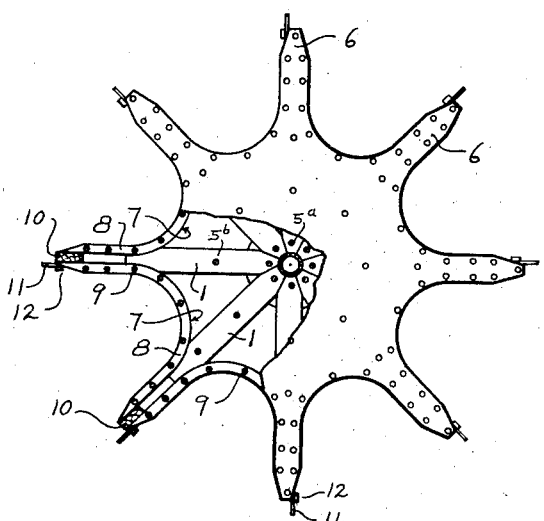
Fig. 3 is an end view of a reel similar to Fig. 1 but slightly modified and with a portion removed to show the interior.
Figure 4:
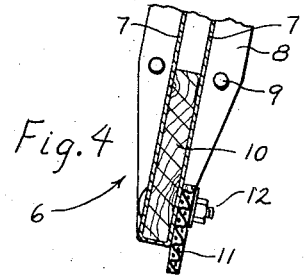
Fig. 4 is an enlarged detail of a portion of Fig. 3.
Figure 2:
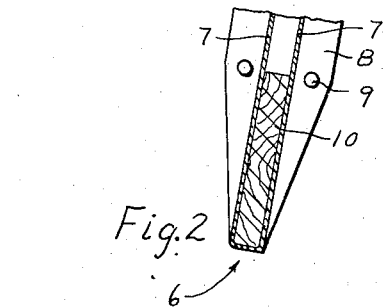
Fig. 2 is an enlarged sectional view of a portion of Fig. 1 taken substantially on the line 2—2 of Fig. 1.

As particularly shown in Figs. 1 and 2, the reel is built up on a frame of radial elements 1—1 fixed to a flange 2 fixed on a shaft 3 as by a pin 4, members 1, conveniently being in contact with a head 5 of suitable sheet material and in the present instance having arms or teeth 6—6 projecting therefrom. Members 1—1 are preferably held in engagement with heads 5 as by bolts, rivets, or the like, 5a and 5b. This structure constitutes one end of the reel and is duplicated at the other end, in each case the elements 1—1 being arranged, if desired, to be enclosed in the completed structure. The space between the two heads is enclosed by U shaped panels 7—7 of suitable sheet material, the heads 5 and the U shaped panels being fixed together at their edges by suitable means such as flanges 8—8 and rivets 9—9, although it is to be understood that other suitable or well-known means for fastening the sheets together are contemplated as equivalent.

It is also to be understood that the particular material used for the reel is not considered essential, sheet metal, hard fiber, fabric, or the like, being contemplated as suitable, although the invention is not to be taken as limited to such material or in fact in any manner.

The completed structure resembles a large hollow gear with a wide face and very narrow teeth. For reinforcing the teeth or blades, braces or slats 10—10 are arranged within the outer edges of the teeth, thus strengthening them at the point where the chance of damage is greatest. This type of reel will handle large amounts of material with extremely little likelihood of the same being caught and wound around the reel.

In the conventional type of reel, in which a series of bats corresponding in a sense to braces 10, are spaced by spiders from the reel shaft it is possible for material to enter into the interior of the reel. This is a disadvantage under certain conditions, namely, when operating in down grain and it is necessary to run the reel close to the ground, and where there are also patches of tall grain left standing. The tall grain will enter the interior of the conventional reel and instead of being propelled into the conveying apparatus of the harvester device, will bend over the inner edges of the bats and be held thereon by centrifugal force, while it continues to rotate with the reel.

Tall material encountering the present reel, particularly if the reel is operating close to the ground, will be bent over by U shaped panels 7 and propelled rearwardly without the possibility of looping over any exposed parts of the reel and rotating therewith as is common in conventional reels.

Sweeps 11—11 of suitable flexible material, or other desired facing means, are arranged on the extremities of teeth 6—6, being held in place preferably by bolts 12—12 or other well-known or suitable fastening means. These sweeps, as above stated, are of suitable flexible material as for example rubberized fabric, and may assist in the action of the reel on the material being harvested and also in protecting the reel to some extent from damage by contact with solid objects.

As will be understood, the use of sweeps 11—11 is not essential to the invention, certain of the advantages of which may be realized without the use thereof.

In operation, the reel is mounted on the harvester in the usual manner and rotated by well-known means, not shown, for urging the grain or other material being harvested into a position to be advantageously operated upon by the harvesting device. The construction of the invention presents a solid exterior to such material and accordingly effects this conveying or urging function in a most expeditious manner. Since the surfaces presented to the material, with the exception of the extremities of teeth 6—6, are smooth and without sharp corners, the likelihood of catching material and winding it about the reel is greatly reduced as compared with any prior reel construction.

The above being a complete description of an illustrative embodiment of the invention, what is claimed as new and desired to be secured by Letters Patent of the United States is:

1. In a reel for a harvesting machine, a plurality of opposed heads, a shaft traversing the heads and about which the reel is adapted to rotate, a plurality of bats extending from spaced points at the periphery of one head to spaced points at the periphery of another head, a plurality of U shaped members of sheet material extending between said heads and joining adjacent bats for providing a reel structure having a closed interior and a plurality of radial elements extending from said shaft toward said bats and fixed with said heads.

2. In a combine, a grain gathering and conveying reel including a plurality of blades and comprising a casing having a pair of heads and U shaped panels connecting the heads, said panels meeting at their outer edges to form the blades.

3. In a harvesting device, a grain gathering and conveying reel, including a plurality of blades and comprising a casing having a plurality of panels extending from each blade inwardly toward the axis of the reel and returning outwardly away from said axis and to the next adjacent blade whereby to prevent access of material being harvested to the interior of the reel.

SHERMAN C. HETH.
WILLIAM B. TALLMAN.